(12) United States Patent
Kraft et al.

(10) Patent No.: US 12,060,134 B2
(45) Date of Patent: Aug. 13, 2024

(54) DRIVE UNIT

(71) Applicant: ZF Friedrichshafen AG, Friedrichshafen (DE)

(72) Inventors: Steffen Kraft, Blaustein (DE); Miran Percic, Heubach (DE); Rüdiger Nierescher, Schwäbisch Gmünd (DE); Klaus Kraft, Blaustein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 26 days.

(21) Appl. No.: 17/913,602

(22) PCT Filed: Feb. 22, 2021

(86) PCT No.: PCT/EP2021/054259
§ 371 (c)(1),
(2) Date: Sep. 22, 2022

(87) PCT Pub. No.: WO2021/190843
PCT Pub. Date: Sep. 30, 2021

(65) Prior Publication Data
US 2023/0145968 A1    May 11, 2023

(30) Foreign Application Priority Data
Mar. 23, 2020   (DE) .................... 10 2020 203 712.4

(51) Int. Cl.
*B62M 6/40*     (2010.01)
*F16D 41/24*    (2006.01)

(52) U.S. Cl.
CPC .............. *B62M 6/40* (2013.01); *F16D 41/24* (2013.01)

(58) Field of Classification Search
CPC .......... B62M 6/40; F16D 41/24; F16H 49/001
USPC ........... 74/625; 180/205.1, 206.1, 206.4, 220
See application file for complete search history.

(56) References Cited

U.S. PATENT DOCUMENTS

| | | | | |
|---|---|---|---|---|
| 4,840,090 A | * | 6/1989 | Iwata ..................... | B25J 9/1025 74/640 |
| 6,152,249 A | * | 11/2000 | Li ............................ | B62M 6/55 180/206.6 |
| 2018/0015985 A1 | * | 1/2018 | Doerndorfer ............ | B62M 6/50 |

(Continued)

FOREIGN PATENT DOCUMENTS

| CN | 102069889 A | 5/2011 | |
|---|---|---|---|
| DE | 102013211430 A1 * | 12/2014 | ............. B62M 6/40 |
| DE | 102014108611 A1 | 12/2014 | |

(Continued)

OTHER PUBLICATIONS

International Search Report (English Translation) PCT/EP2021/054259, dated Apr. 21, 2021. (2 pages).

(Continued)

*Primary Examiner* — T. Scott Fix
(74) *Attorney, Agent, or Firm* — Dority & Manning, P.A.

(57) ABSTRACT

A drive unit (10) for a manually driven vehicle, in particular a bicycle or an EPAC, includes a housing (12), an electric motor (18) with a rotor (44), a bottom bracket shaft (14), a harmonic drive (20) coupled to the rotor (44), and an output shaft (22). The harmonic drive (20) includes an outer bushing with an inner toothing. The outer bushing (38) of the harmonic drive (20) is coupled to the housing (12) via a buffer (64).

33 Claims, 2 Drawing Sheets

(56) References Cited

U.S. PATENT DOCUMENTS

2020/0003289 A1 1/2020 Heise
2021/0356029 A1 11/2021 Rossberger

FOREIGN PATENT DOCUMENTS

| DE | 102015100676 B3 | 6/2016 |
| DE | 202014010823 U1 | 11/2016 |
| DE | 102015223903 A1 | 6/2017 |
| DE | 102020209661 A1 * | 2/2022 |
| EP | 2724926 A1 | 4/2014 |

OTHER PUBLICATIONS

German Office Action DE 10 2020 203 712.4, dated Nov. 11, 2020. (8 pages).

* cited by examiner

DRIVE UNIT

CROSS-REFERENCE TO RELATED APPLICATIONS

The present application is related and claims priority to 102020203712.4 filed in the German Patent Office on Mar. 23, 2020 and is a U.S. national phase of PCT/EP2021/054259 filed in the European Patent Office on Feb. 22, 2021, both of which are incorporated by reference in their entirety for all purposes.

FIELD OF THE INVENTION

The invention relates generally to a drive unit for a manually driven vehicle.

BACKGROUND

DE 10 2015 100 676 A1 discloses a drive assembly with a manual drive, an electric auxiliary drive, and a common driven element. The drive unit has a complex structure with a large number of individual components and bearing points.

EP 2 724 926 A1 discloses a central drive unit with a bottom bracket shaft for manual drive and an auxiliary drive with a downstream planetary transmission. This drive unit also has a relatively complex structure with a large number of individual components.

DE 10 2014 108 611 A1 discloses a bicycle drive device with a drive housing for receiving a bottom bracket shaft and a harmonic drive which is arranged inside the drive housing and can be connected in driving fashion to a traction means carrier. This bicycle drive device also has a complex structure.

SUMMARY OF THE INVENTION

Example aspects of the invention provide an improved drive unit. In particular, a compact structure, reliable functioning, and very quiet running are desirable.

The drive unit is configured for a manually driven vehicle, in particular a bicycle or an EPAC (Electrically Power Assisted Cycle), wherein a manually driven vehicle refers in particular to a vehicle operated by muscular force. The drive unit has a housing, an electric motor with a rotor, a bottom bracket shaft, a harmonic drive coupled to the rotor, and an output shaft. The harmonic drive has an outer bushing with internal teeth, wherein the outer bushing of the harmonic drive is coupled to the housing via a buffer, for example a rubber/metal bearing.

The outer bushing and the housing can in this way be advantageously acoustically decoupled. Independently thereof, it is possible to compensate eccentricities caused, for example, by axial misalignment and/or tilting.

The drive unit has an electric drive branch for an electric drive, wherein the rotor of the electric motor is coupled to the output shaft via the harmonic drive and a first freewheel clutch. The torque of the electric motor is transmitted to the output shaft via the harmonic drive and the first freewheel clutch.

The drive unit has a mechanical or manual drive branch for a manual drive, wherein the bottom bracket shaft is coupled to the output shaft by a further second freewheel clutch. The torque which is applied to the bottom bracket shaft is transmitted to the output shaft via the second freewheel clutch.

The harmonic drive can expediently have a wave generator and a deformable, for example, cylindrical inner bushing with external teeth (flex spine). As explained above, the harmonic drive additionally has a, for example, cylindrical and preferably rigid outer bushing with internal teeth. A compact transmission unit with relatively high transmission ratios is hereby created. This contributes to a strictly coaxial arrangement of the harmonic drive and the drive unit as a whole.

The outer bushing of the harmonic drive can advantageously be coupled non-rotatably to the housing. The outer bushing can thus serve as a torque support mechanism relative to the housing. By virtue of the non-rotatable outer bushing, there is no superimposition with the rotational movement of the flex spline. For example, the rotational movement of the flex spline may not be superimposed on the non-rotatable outer bushing.

The bottom bracket shaft and the harmonic drive can expediently each be coupled to the output shaft by a freewheel clutch, wherein the harmonic drive, the freewheel clutches, and the output shaft can be arranged coaxially with one another in the housing. By virtue of the design with a harmonic drive as a single-stage transmission unit, a coaxial and particularly compact transmission unit is provided, which in turn favors a compact and space-saving design of the drive assembly. A manual drive and an electrically assisted drive are provided by the coupling to the output shaft. Torque addition, i.e., addition of the torques of the bottom bracket shaft and the electric motor, takes place at the output shaft. The output shaft can be designed as a hollow shaft.

The outer bushing of the harmonic drive and the buffer, possibly with an inner ring, an elastomeric body, and/or an outer ring, can advantageously be formed as a premountable unit such that the premounted unit can be mounted en bloc in the housing of the drive unit. The mounting is favored as a result because components do not need to be mounted individually in the housing and instead can be inserted as a premounted unit, i.e., as an assembly. The time required for final mounting may be shortened as a result.

The buffer can expediently have a metal inner ring and a metal outer ring, wherein an elastomeric body, for example an annular elastomeric body, can be arranged radially between the inner ring and the outer ring. In addition to acoustic decoupling, damping of torque peaks imparted by the motor can thus also take place. The buffer can thus act as a torsion spring. The outer ring can bear against an inner circumferential surface of the housing with the outer circumferential surface of the outer ring. The outer bushing of the harmonic drive can bear against an inner circumferential surface of the inner ring of the buffer with the outer circumferential surface of the outer bush. It is likewise conceivable that the elastomeric body has a non-annular geometry. For example, geometry of the teeth with a defined intermediate space which is elastically connected by the buffer can be formed between the inner ring and the outer ring. The buffer can then be formed optionally such that the buffer has an acoustic damping effect and ensures tolerance compensation in terms of amount and installed position.

The outer bushing of the harmonic drive can advantageously be coupled to the inner ring of the buffer by a snug or interference fit. This allows a structurally simple and precise fastening of the outer bushing to the inner ring. Mounting of the components on one another, for example also of a premountable unit, is favored hereby.

The outer ring of the buffer can expediently be formed from the same material as the housing of the drive unit or from a material with the same coefficient of expansion as the housing of the drive unit. Expansion of the material can be compensated in this way. The outer ring is also coupled more securely to the housing when thermal influences occur.

The inner ring of the buffer can expediently be formed from the same material as the outer bushing of the harmonic drive or from a material with the same coefficient of expansion as the outer bushing of the harmonic drive. Expansion of the material can be compensated in this way. The inner ring and the outer bushing are also coupled more securely to each other when thermal influences occur.

The inner ring of the buffer can expediently be formed from steel and/or the outer ring of the buffer can be formed from aluminum. A stable structure with a relatively low weight is possible as a result. Particularly advantageous compensation of the expansion of the material results. The housing of the drive unit can be formed from aluminum. The outer bushing of the harmonic drive can be formed from steel.

The elastomeric body advantageously has a first front side and an opposite second front side, wherein a preferably annular circumferential recess is formed at least at one of the front sides, in particular at both front sides. The damping effect produced by the buffer can be influenced as a result. The bearing can be designed with optimal axial, radial, and/or rotational stiffness. The recesses formed at the front can have, for example, a triangular cross-section.

BRIEF DESCRIPTION OF THE DRAWINGS

Example aspects of the invention are explained in detail below with the aid of the drawings, wherein the same elements or elements with the same function are provided with identical reference numerals. In the drawings.

DETAILED DESCRIPTION

Figure 1:
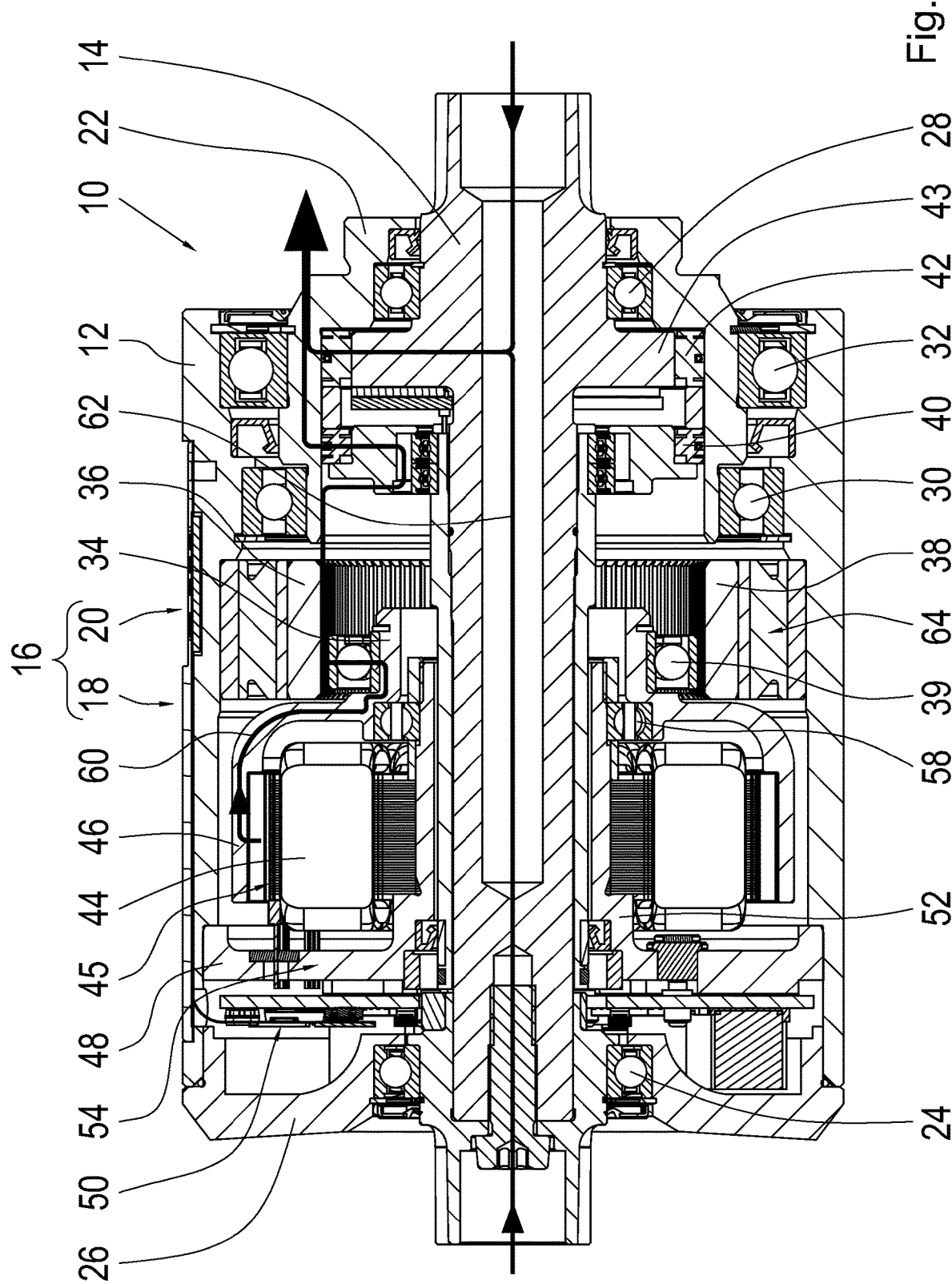
FIG. 1 shows an example embodiment of a drive unit in a view in section.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a drive unit for a manually driven vehicle, in particular a bicycle or an EPAC, wherein the drive unit as a whole is provided with the reference numeral 10.

The drive unit 10 has a housing 12 on or in which the components of the drive unit 10 are arranged. The drive unit 10 has, for manual drive by muscular force, a bottom bracket shaft 14 which is rotatably mounted in the housing 12. In addition, the drive unit 10 has an electric auxiliary drive 16 which has an electric motor 18 and a harmonic drive 20, wherein the electric motor 18 is mechanically coupled to the harmonic drive 20. The bottom bracket shaft 14 and the auxiliary drive 16 are coupled to an output shaft 22 on which a chain ring carrier or a chain ring can be fastened (not illustrated).

The bottom bracket shaft 14 is mounted on a housing cover 26, which closes the housing 12 of the drive unit 10 on one side (on the left-hand side in FIG. 1), by a first rolling bearing 24. In addition, the bottom bracket shaft 14 is mounted rotatably on the output shaft 22 designed as a hollow shaft by a second rolling bearing 28. The output shaft 22 is mounted rotatably relative to the housing 12 by a third rolling bearing 30 and a fourth rolling bearing 32.

The harmonic drive 20 has a wave generator 34, a deformable inner bushing 36 with external teeth (flex spine), and an outer bushing 38 with internal teeth. The harmonic drive 20 is coupled on the input side to the electric motor 18 and on the output side to the output shaft 22, and to be precise by a first freewheel clutch 40.

The bottom bracket shaft 14 is coupled to the output shaft 22 by a second freewheel clutch 42. At this point, the bottom bracket shaft 14 can have a radially outward projecting shaft shoulder 43 which is in contact with the second freewheel clutch 42. The harmonic drive 20, the freewheel clutches 40, 42, and the output shaft 22 are arranged coaxially with one another in the housing 12.

The electric motor 18 has a stator 44 with stator coils 45 and a rotor 46. The rotor 46 is coupled to the harmonic drive 20, in particular to the flex spline 36. The rolling bearing 39 of the flex spline 36 (flex bearing) is mounted on a, for example, sleeve-shaped connecting section of the rotor 46.

The drive unit 10 furthermore has a stator carrier 48 and an electronic unit which can be designed as an electronic circuit board 50. The stator carrier 48 has a, for example, sleeve-shaped carrying section 52 and a, for example, disk-shaped fastening section 54.

The stator 44 is fastened to the carrying section 52 and the rotor 46 is mounted rotatably on the carrying section 52 by a rolling bearing 58. The stator carrier 48 can be connected to the housing 12 of the drive unit 10 via the fastening section 54.

The drive unit 10 has an electric drive branch 60 for an electric drive, wherein the rotor 46 of the electric motor 18 is coupled to the output shaft 22 via the harmonic drive 20 and the first freewheel clutch 40. The torque of the electric motor 18 is transmitted to the output shaft 22 via the harmonic drive 20 and the first freewheel clutch 40.

The drive unit 10 has a mechanical or manual drive branch 62, wherein the bottom bracket shaft 14 is coupled to the output shaft 22 by the second freewheel clutch 42. The torque, which is applied to the bottom bracket shaft 14, is transmitted to the output shaft 22 via the second freewheel clutch 22.

The outer bushing 38 of the harmonic drive 20 is coupled non-rotatably to the housing 12. The outer bushing 38 can thus serve as a torque support mechanism relative to the housing 12. The outer bushing 38 of the harmonic drive 20 is coupled to the housing 12 via a buffer 64, for example a rubber/metal bearing, with a preferably multi-part design.

Figure 2:
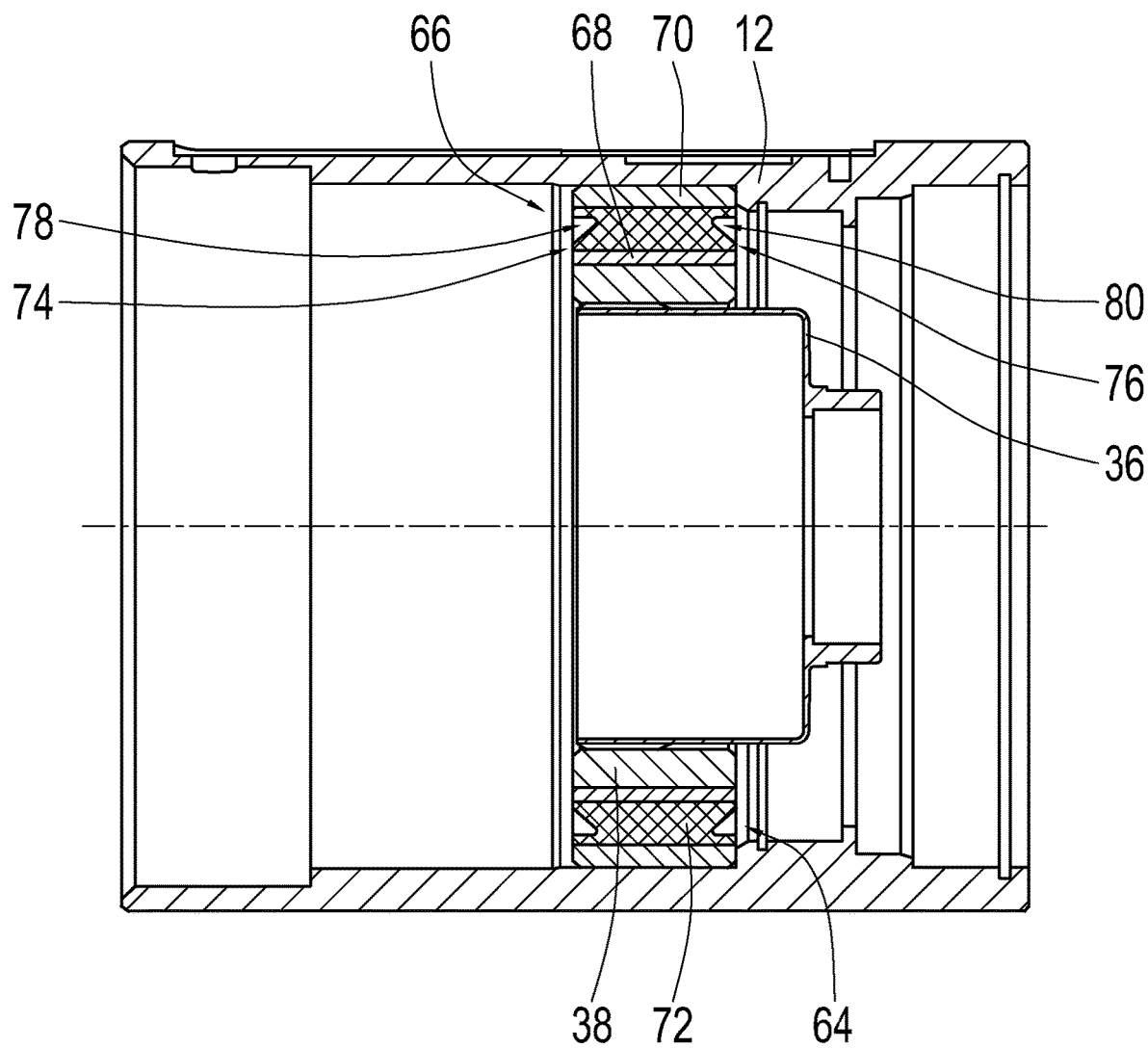
FIG. 2 shows the housing, the buffer, the outer bushing, and the flex spine of the harmonic drive of the drive unit from FIG. 1 in a schematic view.

The outer bushing 38 of the harmonic drive 20 and the buffer 64 are formed as a premountable unit 66 (FIG. 2) such that the premounted unit 66 can be mounted en bloc in the housing 12 of the drive unit 10 in the premounted state.

The buffer 64 has a metal inner ring 68 and a metal outer ring 70, wherein a, for example, annular elastomeric body 72 is arranged radially between the inner ring 68 and the outer ring 70. The outer ring 70 bears with the outer circumferential surface of the outer ring 70 against an inner circumferential surface of the housing 12. The outer bushing 38 of the harmonic drive 20 bears with the outer circumferential surface of the outer bushing 38 against an inner circumferential surface of the inner ring 68.

The outer bushing 38 of the harmonic drive 20 is coupled to the inner ring 68 of the buffer 64 by a snug or interference fit.

The outer ring 70 is formed from the same material as the housing 12 of the drive unit 10 or from a material with the same coefficient of expansion as the housing 12 of the drive unit 10. The outer ring 70 and/or the housing 12 can be formed from aluminum.

The inner ring 68 is formed from the same material as the outer bushing 38 of the harmonic drive 20 or from a material with the same coefficient of expansion as the outer bushing 38 of the harmonic drive 20. The inner ring 68 and/or the outer bushing 38 can be formed from steel.

The elastomeric body 72 has a first front side 74 and an opposite second front side 76. A circumferential recess 78, 80 is in each case formed on the front sides 74, 76. The recesses 78, 80 can have, for example, a triangular cross-section.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE NUMERALS 10 drive unit
12 housing
14 bottom bracket shaft
16 auxiliary drive, electric
18 electric motor
20 harmonic drive
22 output shaft
24 first rolling bearing
26 housing cover
28 second rolling bearing
30 third rolling bearing
32 fourth rolling bearing
34 wave generator
36 inner bushing
38 outer bushing
39 rolling bearing (flex bearing)
40 first freewheel clutch
42 second freewheel clutch
43 shaft shoulder
44 stator
46 rotor
48 stator carrier
50 electronic circuit board, unit
52 carrying section
54 fastening section
58 rolling bearing
60 electric drive branch
62 manual drive branch
64 buffer
66 premountable unit
68 inner ring
70 outer ring
72 elastomeric body
74 first front side
76 second front side
78 recess
80 recess

The invention claimed is:

1. A drive unit (10) for a manually driven vehicle, comprising:
a housing (12);
an electric motor (18) with a rotor (46);
a bottom bracket shaft (14);
a harmonic drive (20) coupled to the rotor (46), the harmonic drive (20) comprising an outer bushing (38) with internal teeth; and
an output shaft (22),
wherein the outer bushing (38) of the harmonic drive (20) is mounted to the housing (12) via a buffer (64) arranged radially between the outer bushing (38) of the harmonic drive (20) and the housing (12), and
wherein the buffer (64) comprises an elastomeric body configured for acoustically decoupling the outer bushing (38) of the harmonic drive (20) from the housing (12).

2. The drive unit (10) of claim 1, wherein the harmonic drive (20) comprises a wave generator (34) and a deformable inner bushing (36) with external teeth.

3. The drive unit (10) of claim 1, wherein the outer bushing (38) of the harmonic drive (20) is non-rotatably coupled to the housing (12).

4. A drive unit (10) for a manually driven vehicle, comprising:
a housing (12);
an electric motor (18) with a rotor (46);
a bottom bracket shaft (14);
a harmonic drive (20) coupled to the rotor (46), the harmonic drive (20) comprising an outer bushing (38) with internal teeth; and
an output shaft (22),
wherein the outer bushing (38) of the harmonic drive (20) is coupled to the housing (12) via a buffer (64),
wherein the bottom bracket shaft (14) is coupled to the output shaft (22) by a first freewheel clutch (42),
wherein the harmonic drive (20) is coupled to the output shaft (22) by a second freewheel clutch (40), and
wherein the harmonic drive (20), the first and second freewheel clutches (40, 42), and the output shaft (22) are arranged coaxially in the housing (12).

5. The drive unit (10) of claim 1, wherein the outer bushing (38) of the harmonic drive (20) and the buffer (64) are formed as a premountable unit (66) such that the premountable unit (66) is mountable in the housing (12) of the drive unit (10).

6. The drive unit (10) of claim 1, wherein the buffer (64) comprises a metal inner ring (68) and a metal outer ring (70), and an elastomeric body (72) is arranged radially between the inner ring (68) and the outer ring (70).

7. A drive unit (10) for a manually driven vehicle, comprising:
a housing (12);
an electric motor (18) with a rotor (46);
a bottom bracket shaft (14);
a harmonic drive (20) coupled to the rotor (46), the harmonic drive (20) comprising an outer bushing (38) with internal teeth; and
an output shaft (22),
wherein the outer bushing (38) of the harmonic drive (20) is coupled to the housing (12) via a buffer (64), wherein the buffer (64) comprises a metal inner ring (68) and a metal outer ring (70), and an elastomeric body (72) is arranged radially between the inner ring (68) and the outer ring (70), and wherein the outer bushing (38) of the harmonic drive (20) is coupled to the inner ring (68) of the buffer (64) by interference fit.

8. The drive unit (10) of claim 6, wherein the outer ring (70) of the buffer (64) is formed from a common material as the housing (12) of the drive unit (10) or from a material with a common coefficient of expansion as the housing (12) of the drive unit (10).

9. The drive unit (10) of claim 6, wherein the inner ring (68) of the buffer (64) is formed from a common material as the outer bushing (38) of the harmonic drive (20) or from a material with a common coefficient of expansion as the outer bushing (38) of the harmonic drive (20).

10. The drive unit (10) of claim 6, wherein the inner ring (68) is formed from steel, and/or the outer ring (70) is formed from aluminum.

11. A drive unit (10) for a manually driven vehicle comprising:
a housing (12);
an electric motor (18) with a rotor (46);
a bottom bracket shaft (14);
a harmonic drive (20) coupled to the rotor (46), the harmonic drive (20) comprising an outer bushing (38) with internal teeth; and
an output shaft (22),
wherein the outer bushing (38) of the harmonic drive (20) is coupled to the housing (12) via a buffer (64),
wherein the buffer (64) comprises a metal inner ring (68) and a metal outer ring (70), and an elastomeric body (72) is arranged radially between the inner ring (68) and the outer ring (70), and
wherein the elastomeric body (72) has a first side (74) and an opposite second side (76), and a circumferential recess (78, 80) is formed on one or both of the first and second sides of the elastomeric body (72).

12. The drive unit (10) of claim 1, wherein:
the bottom bracket shaft (14) is coupled to the output shaft (22) by a first freewheel clutch (42);
the harmonic drive (20) is coupled to the output shaft (22) by a second freewheel clutch (40); and
the harmonic drive (20), the first and second freewheel clutches (40, 42), and the output shaft (22) are arranged coaxially in the housing (12).

13. The drive unit (10) of claim 6, wherein the outer bushing (38) of the harmonic drive (20) is coupled to the inner ring (68) of the buffer (64) by interference fit.

14. The drive unit (10) of claim 6, wherein the elastomeric body (72) has a first side (74) and an opposite second side (76), and a circumferential recess (78, 80) is formed on one or both of the first and second sides of the elastomeric body (72).

15. The drive unit (10) of claim 4, wherein the harmonic drive (20) comprises a wave generator (34) and a deformable inner bushing (36) with external teeth.

16. The drive unit (10) of claim 4, wherein the outer bushing (38) of the harmonic drive (20) is non-rotatably coupled to the housing (12).

17. The drive unit (10) of claim 4, wherein the outer bushing (38) of the harmonic drive (20) and the buffer (64) are formed as a premountable unit (66) such that the premountable unit (66) is mountable in the housing (12) of the drive unit (10).

18. The drive unit (10) of claim 4, wherein the buffer (64) comprises a metal inner ring (68) and a metal outer ring (70), and an elastomeric body (72) is arranged radially between the inner ring (68) and the outer ring (70).

19. The drive unit (10) of claim 18, wherein the outer ring (70) of the buffer (64) is formed from a common material as the housing (12) of the drive unit (10) or from a material with a common coefficient of expansion as the housing (12) of the drive unit (10).

20. The drive unit (10) of claim 18, wherein the inner ring (68) of the buffer (64) is formed from a common material as the outer bushing (38) of the harmonic drive (20) or from a material with a common coefficient of expansion as the outer bushing (38) of the harmonic drive (20).

21. The drive unit (10) of claim 18, wherein the inner ring (68) is formed from steel, and/or the outer ring (70) is formed from aluminum.

22. The drive unit (10) of claim 7, wherein the harmonic drive (20) comprises a wave generator (34) and a deformable inner bushing (36) with external teeth.

23. The drive unit (10) of claim 7, wherein the outer bushing (38) of the harmonic drive (20) is non-rotatably coupled to the housing (12).

24. The drive unit (10) of claim 7, wherein the outer bushing (38) of the harmonic drive (20) and the buffer (64) are formed as a premountable unit (66) such that the premountable unit (66) is mountable in the housing (12) of the drive unit (10).

25. The drive unit (10) of claim 7, wherein the outer ring (70) of the buffer (64) is formed from a common material as the housing (12) of the drive unit (10) or from a material with a common coefficient of expansion as the housing (12) of the drive unit (10).

26. The drive unit (10) of claim 7, wherein the inner ring (68) of the buffer (64) is formed from a common material as the outer bushing (38) of the harmonic drive (20) or from a material with a common coefficient of expansion as the outer bushing (38) of the harmonic drive (20).

27. The drive unit (10) of claim 7, wherein the inner ring (68) is formed from steel, and/or the outer ring (70) is formed from aluminum.

28. The drive unit (10) of claim 11, wherein the harmonic drive (20) comprises a wave generator (34) and a deformable inner bushing (36) with external teeth.

29. The drive unit (10) of claim 11, wherein the outer bushing (38) of the harmonic drive (20) is non-rotatably coupled to the housing (12).

30. The drive unit (10) of claim 11, wherein the outer bushing (38) of the harmonic drive (20) and the buffer (64) are formed as a premountable unit (66) such that the premountable unit (66) is mountable in the housing (12) of the drive unit (10).

31. The drive unit (10) of claim 11, wherein the outer ring (70) of the buffer (64) is formed from a common material as the housing (12) of the drive unit (10) or from a material with a common coefficient of expansion as the housing (12) of the drive unit (10).

32. The drive unit (10) of claim 11, wherein the inner ring (68) of the buffer (64) is formed from a common material as the outer bushing (38) of the harmonic drive (20) or from a material with a common coefficient of expansion as the outer bushing (38) of the harmonic drive (20).

33. The drive unit (10) of claim 11, wherein the inner ring (68) is formed from steel, and/or the outer ring (70) is formed from aluminum.

* * * * *